(12) United States Patent  
Bittar

(10) Patent No.: US 6,793,750 B2  
(45) Date of Patent: Sep. 21, 2004

(54) HAND HELD FISHING LINE WELDER

(76) Inventor: Edward S. Bittar, 650 S. Riverside Dr., Indialantic, FL (US) 32903

( * ) Notice: Subject to any disclaimer, the term of this patent is extended or adjusted under 35 U.S.C. 154(b) by 0 days.

(21) Appl. No.: 10/184,341

(22) Filed: Jun. 27, 2002

(65) Prior Publication Data

US 2003/0000621 A1 Jan. 2, 2003

Related U.S. Application Data

(60) Provisional application No. 60/301,766, filed on Jun. 28, 2001.

(51) Int. Cl.$^7$ .............................................. B29C 65/08
(52) U.S. Cl. ...................... 156/73.2; 156/73.1; 156/158
(58) Field of Search ................................ 156/73.1, 73.2, 156/157, 158, 579, 580.1, 580.2, 581, 583.1

(56) References Cited

U.S. PATENT DOCUMENTS

| | | |
|---|---|---|
| 2,617,914 A | 11/1952 | Keller |
| 3,040,153 A | 6/1962 | Seney |
| 3,184,354 A | 5/1965 | Strother |
| 3,690,994 A | 9/1972 | Williams |
| 3,765,973 A | 10/1973 | Kramer |
| 3,886,870 A | 6/1975 | Morin |
| 3,936,971 A | 2/1976 | McGahee |
| 4,631,685 A | 12/1986 | Peter |
| 4,916,850 A | 4/1990 | Dodge |
| 4,937,966 A | 7/1990 | McKenzie |
| 5,042,190 A | 8/1991 | Calvin |
| 5,769,100 A | 6/1998 | Alexander |
| 6,135,124 A * | 10/2000 | Grant .......................... 132/271 |
| 6,313,439 B1 * | 11/2001 | Fischbach et al. .......... 219/223 |

FOREIGN PATENT DOCUMENTS

| | | |
|---|---|---|
| DE | 70 22 038 | 9/1970 |
| DE | 28 32 550 | 2/1980 |
| DE | 3836735 A1 | 5/1990 |
| FR | 2 006 919 | 1/1970 |

OTHER PUBLICATIONS

Patent Abstracts of Japan, vol. 1997, No. 05, May 30, 1997, JP 09 01 2226 A (Fuji Spinning Co, Ltd.) Jan. 14, 1997.
Patent Abstracts of Japan, vol. 06, No 249 (M–177) Dec. 8, 1982 JP 57 146623 A (Misaki Giyogokk) Sep. 10, 1982.
Patent Abstracts of Japan, vol. 1987, No. 10, Oct. 31, 1997 JP 09 155979 A (Meiwa Sancyo KK et al, Jun. 17, 1997.

* cited by examiner

*Primary Examiner*—James Sells
(74) *Attorney, Agent, or Firm*—Roger M. Rathbun

(57) ABSTRACT

A hand held device for joining monofilament lines together. Then device has a set of clamping jaws that can be manipulated so as to firmly position the monofilament lines in an abutting relationship in physical contact to each other. The device includes a source of electrical power and a heater, such as resistance, RF energy or ultrasonic energy, to heat the monofilament lines to a temperature exceeding the melting temperature of the monofilament lines so as to weld the monofilament lines together. A sleeve may be slipped over the monofilament lines and welded to the lines to form a more stable junction.

6 Claims, 4 Drawing Sheets

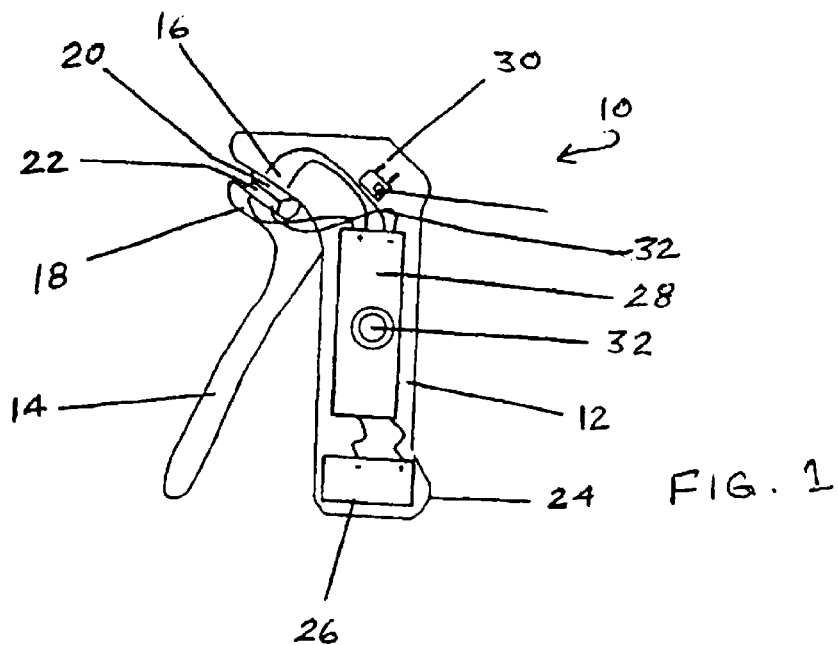
FIG. 1
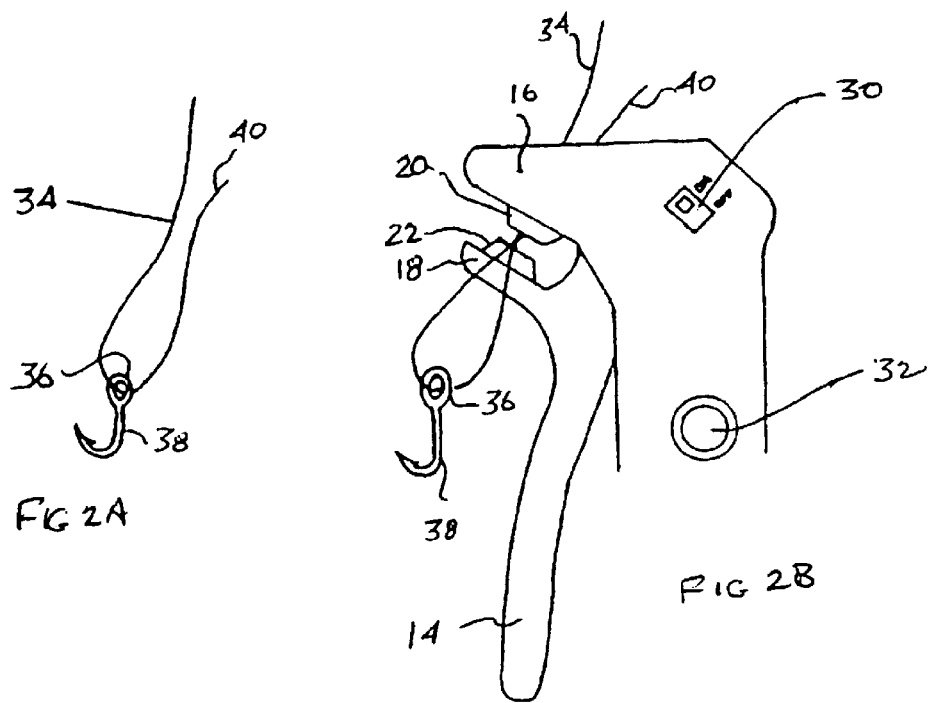
FIG 2A
FIG 2B

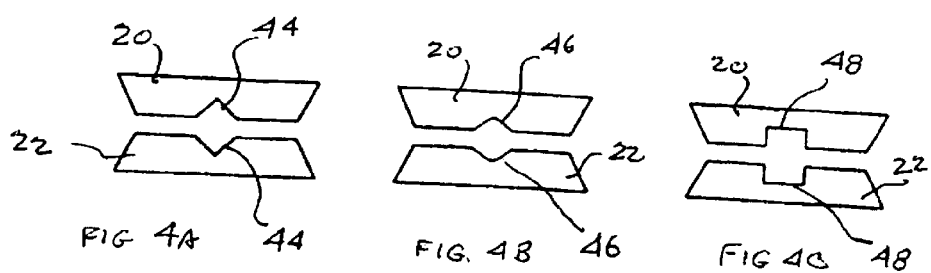

HAND HELD FISHING LINE WELDER

REFERENCE TO RELATED CASES

The present application is based upon Provisional Application Ser. No. 60/301,766 filed Jun. 28, 2001 and entitled HAND HELD MONOFILAMENT FISHING LINE WELDER.

BACKGROUND OF THE INVENTION

The present invention relates to a device for securing monofilament lines together, and, more particularly, to a device that is self powered and which can be used to weld fishing lines to each other.

In the sport of fishing, there are number of instances where it is necessary to secure monofilament fishing lines together in a sturdy, tight affixation, such as, for example, in the need to secure the hook to the end of a fishing line, the joining of monofilament fishing lines together to add length to a fishing line, or in simply adding a leader to the fishing line. Other components that are normally added to a fishing line include fasteners, buttons, weights, floats, lures and the like. Obviously, the need to secure two lines together is also necessary in the event that a fishing line has been inadvertently broken or even deliberately cut to release an undesirable fish from the end of the line.

As used herein, obviously, the invention will be described as the affixing of monofilament lines together, however, it will be understood that the present invention may only be using one monofilament line that is looped back over itself and then be secured to itself so as to form a loop in a single monofilament line.

In any case, it is relatively important that the affixation of the fishing lines together be secure, tight and, also, of importance, that the affixation be relatively easy to carry out since normally the operation of carrying out such procedure takes place in a less than convenient location, that is, the securing of the lines may take place on a fishing boat that is continually in motion, or at some shore facility where the surrounding environment is not particularly conducive to a time-consuming, somewhat intricate procedure to secure the lines together.

In the normal procedure, the fishing lines are manually tied together and a knot is used to affix the differing lines together. In many cases, it is necessary to double knot the line to prevent unraveling and to provide a secure attachment.

There are, however several disadvantages to the use of knots. For example, the multiple knots create a disturbance in the water as the multiple knots travel through the water and a loose series of such knots can actually repel fish by creating excessive turbulence in the water.

In addition, while the resulting knot normally serves to adequately affix the lines together, in many instances the knot is not sufficiently secure, such as when the knot is tied by someone that is inexperienced in the knot tying technique such that the knot later becomes untied and the fishing lines separated during the subsequent use of the joined fishing line.

Further, of course the normal monofilament fishing line itself is stiff and clear, two characteristics that make such lines difficult to work with, particularly in the early morning or late event hours when visibility is diminished. The exterior surface is also very slippery and lubricious and the very tying of a knot is not a simple operation as the lines do not readily adhere to each other. The monofilament line also has a memory and consequently often tends to become loose despite the original tightness of the knot or knots.

As such, the securing of the knot is basically related to the skill of the person tying the knot and a less skilled person has more difficulty in securing the lines together and, consequently, there is more likelihood of a knot later becoming untied and the lines again separated.

In an example, in U.S. Pat. No. 4,937,966 of McKenzie, there has been suggested the bonding of a monofilament fishing line to a fishing hook by heating the hook above the softening temperature of that monofilament line and then touching the fishing line to the hook. However, the heating means in the McKenzie patent is described to be a match, candle or the like and is not a particularly useful procedure in adverse conditions where the environment may comprise wind and water spray that would seem to make the process quite difficult.

Accordingly, it would be advantageous to have a device that can affix monofilament fishing lines together and not be dependent upon the skill or dexterity of the user and which can be used to create a weld between the fishing lines resulting in a strong bond therebetween.

It would also be advantageous to have a device that could easily and simply carry out the affixing of monofilament lines together having an independent source of power so that the welding or bonding of the fishing lines could be accomplished in any environment safely and without the need for local power or heat and the resultant bond be readily attainable in adverse conditions to uniformly provide a good bond between such fishing lines.

SUMMARY OF THE INVENTION

Accordingly, the present invention relates to a device to carry out the efficient and easy welding of monofilament fishing line. The process of welding monofilament fishing line itself is simple, rapidly accomplished and provides an end product junction or connection that is relatively streamlined so as to create a minimum of disturbance as the connection is drawn through the water.

Thus, in the process of welding monofilament fishing line, the actual bond between the individual lines is created by applying heat to one or more surfaces of the monofilament material to cause some melting and consequent joining of the lines. The welding can be accomplished by one of at least three techniques, that is, (a) heating through the conduction of thermal energy, (b) heating of the monofilament line by means of ultrasonic frequencies and (c) heating of the monofilament line by the use of radio frequency (RF) energy.

The present invention can apply any of the aforementioned techniques and comprises a hand held device that has its own internal power source so that the device can be taken to and used in any environment, even where no source of power is available. Accordingly, the present hand held welding device can be easily carried by a user in a fishing box along with other accessories and devices used in fishing. The internal power for the present hand held welding device can be supplied by batteries, rechargeable or not, or the power can be supplied by means of solar power cells. Alternatively, a combination of batteries and solar powered cells can be used where the solar cells are used to recharge the batteries.

The device has a pair of handgrips that control the spacing between a pair of clamping jaws such that the jaws can be moved between an open position where there is a space between the jaws and a closed position where the jaws are tightly fitted together to hold the fishing lines therebetween. In the device, one of the jaws is preferably movable with the other of the jaws being stationary. The handgrips are provided for gripping by the user and the manual manipulation of the handgrips allows the user to move the clamping jaws between the open and the closed positions.

In the preferred embodiment, the jaws are biased away from each other so that the user can simply squeeze the handgrips together to move the jaws to the closed position and, by releasing the handgrips, the jaws return to the normally open position.

The configuration of the jaws is designed so as to cause the monofilament fishing lines to be held in a close abutting relationship and, while in such position, the user can activate the heating means to raise the temperature of the plastic monofilament lines to a temperature in excess of the melting point of the material of the fishing lines so that a melting takes place to weld the fishing lines together.

These and other features and advantages of the present invention will become more readily apparent during the following detailed description taken in conjunction with the drawings herein.

BRIEF DESCRIPTION OF THE DRAWINGS

FIG. 1 is a schematic side view of a hand held fishing line welding device constructed in accordance with the present invention;

FIG. 2A is a view of a fishing line with a hook loosely affixed thereto;

FIG. 2B is a schematic side view of the device of FIG. 1 with a fishing line in place therein and with the jaws in the open position;

FIGS. 4A, 4B and 4C are side views of various typical configurations of the upper and lower welding plates used with the present invention.

DETAILED DESCRIPTION OF THE INVENTION

Figure 2C:
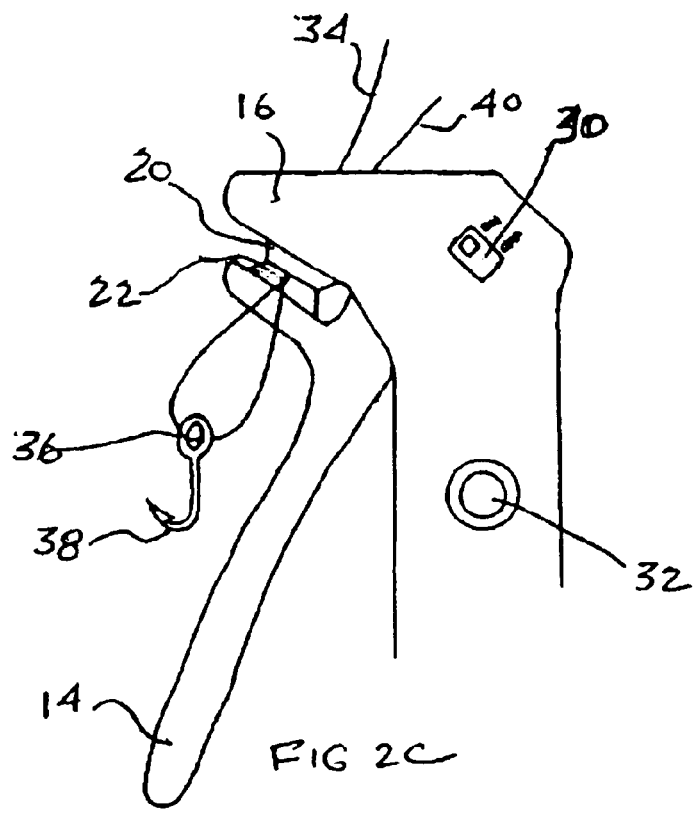
FIG. 2C is a schematic side view of the device of FIG. 1 with the jaws in the closed position and a fishing line in position between the jaws.

Referring now to FIG. 1, there is shown a schematic side view of a hand held fishing line welding device 10 constructed in accordance with the present invention. As can be seen, the device 10 comprises a main body 12 which is configured in the shape of a hand grip and functions as the same and operates in conjunction with a movable hand grip 14. Both hand grips are used in carrying out the manipulation of the device 10 in its use. Thus, the main body 12 acts as a stationary hand grip that is grasped by the meat of the user's hand to hold the device 10 with the fingers encircling the movable hand grip 14. The movable hand grip 14 is pivotally affixed to the main body 12 and therefore can be pivoted about the main body 12 by moving that movable hand grip 14.

There is an upper jaw 16 that is formed in the main body 12 and a lower jaw 18 that is formed in the upper portion of the movable hand grip and the upper and lower jaws 16, 18 are aligned such that they are facing each other. While the terms "upper" and "lower" are used herein, it can be seen that the overall device 10 can be used in any orientation such as sidewise, in only being of importance that there are two oppositely disposed jaws that can be moved relative to each other as will be explained.

In the embodiment as shown in FIG. 1, the lower jaw 18 is formed on the movable hand grip 14 so that the lower jaw 18 can be moved with respect to the upper jaw 16 by manipulation of the movable hand grip 14 with respect to the main body 12 hand grip. Thus, by squeezing the movable hand grip 14, that is, by pulling it inwardly toward the main body 12, the lower jaw 18 can be moved toward the upper jaw 16 and ultimately into a closed position.

As can be seen, there is also an upper welding plate 20 that is affixed to the upper jaw 16 and a lower welding plate 22 that is affixed to the lower jaw 18. The welding plates 20 and 22 abut firmly against each other when the upper and lower jaws 16, 18 are in the closed position and, as will be seen, hold the fishing wire therebetween in carrying out the welding process with the present device 10. The welding plates 20, 22 are preferably good heat conductors and can be made out of a conductive metal such as copper.

The components of the present fishing line welding device 10 of the present invention can now be explained along with their preferred orientation. In particular, in the heel 24 of the main body 12, there is a battery 26 that can be retained in the main body 12 but accessible by means of a removable cover for the replacement thereof. The battery 26 can be a non-recharging battery or may be a rechargeable battery in conventional manner and may include one or more solar cells so that the battery can be recharged by exposure to the sunlight as would, hopefully, be readily available in the normal fishing function.

The battery 26 provides the power for a microprocessor circuitry 28 that is also fitted with the main body 12 of the welding device 10. In the case of RF heating, the circuitry 28 provides the RF energy from the battery power or, in the case or ultrasonic heating with the device 10, the circuitry 28 can convert the battery power into energy in the spectra of ultrasonic frequencies. In the case of resistance heating of the device 10, the circuitry 28 may be simply overheating protection and the like.

In addition, there is a main power switch 30 that is affixed within the main body 12 and which serves to provide an on-off function of the device. Thus, the main power switch 30 is a means to activate and shut off the main power for the battery 26 to the circuitry 28. A further power control is present in the form of a welding power button 32 that is also affixed within the main body 12 and is a user activated, spring loaded button that can be simply pushed by the user to activate the RF, ultrasonic or resistance heating to the upper and lower welding plates 20, 22.

As also can be seen, wires 33 are present to transmit the power to the upper and lower welding plates 20, 22 to complete the various circuits.

Thus, with the foregoing explanation of the various components of the fishing line welding device 10, the use of the device 10 can also be explained. In the use of the present device 10, the main power switch 30 is moved to the on position whereby the electrical power from the battery 26 is activated to power the fishing line welding device 10. The upper and lower jaws 16, 18 are movable by a manipulation by the user between an open and a closed position and, when in the closed position, the user can activate the welding power button 32 to carry out the welding procedure of the present invention.

To more specifically show the actual use of the present invention, and turning now to FIG. 2A, there is shown a typical monofilament plastic fishing line 34 that has been passed through eye 36 of a fishhook 38 leaving the main fishing line 34 and the free end 40 of that fishing line 34. Accordingly, to secure the fishhook 38 to the fishing line 34, the free end 40 must be affixed somehow back to the fishing line 34 to close the loop and capture the fishhook 38.

To carry out that procedure, turning now to FIG. 2B, the main fishing line 34 and the free end 40 are both positioned side by side, that is, in abutting relationship to each other, and which pass in between the upper and lower welding plates 20, 22 of the fishing line welding device 10. As noted, the upper jaw 16 and the lower jaw 18 are in the open position, that is, there is a space between the upper and lower welding plates 20, 22 to enable the user to easily interfit the fishing line therebetween.

Turning now to FIG. 2C, there is shown an illustration of the fishing line welding device 10 with the upper and lower jaws 16, 18 in the closed position such that the fishing line 34, as well as its free end 40 are tightly held between the upper and lower welding plates 20, 22 where that fishing line 34 and the free end 40 are abutted together. At that point, the user can activate the welding power button 32 to provide a heating of the fishing line 34 by means of the RF heating, ultrasonic heating or resistance heating such that the melting point of the monofilament plastic material is exceeded and the fishing line 34 actually melts to weld the fishing line 34 and its free end 40 firmly together.

Figure 2D:
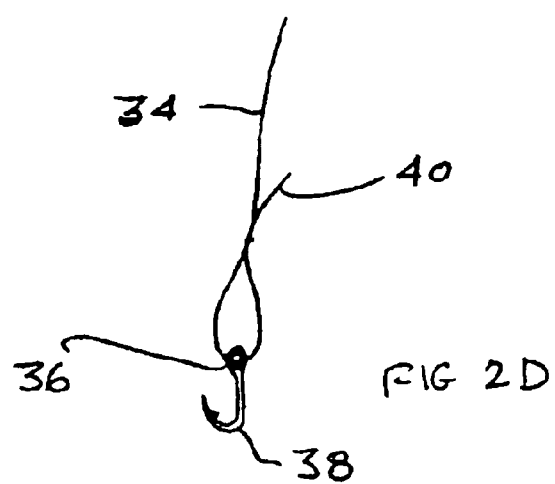
FIG. 2D is a view of a fishing line that has been welded by means of the present invention.

Next, in FIG. 2D, there is shown a fishing line 34 that has had the free end 40 welded thereto, by means of the present invention and with the fishhook 38 affixed thereto and the actual junction or weld is a relatively streamlined configuration so as not to cause excessive turbulence as the fishing line 34 is pulled through the water.

As can now be seen, the example depicted the joining of a fishing line and a free end thereof, however, the welding of two or more strands of a monofilament line can, of course, be used to weld two fishing lines together for a variety of purposes and not simply to join the free end of a fishing line over upon itself and can, for example, include a procedure to add leader, extend the length of a fishing line or other type of procedure where a solid junction is needed between two or more monofilament plastic lines.

Figures 3A, 3B, 3C:
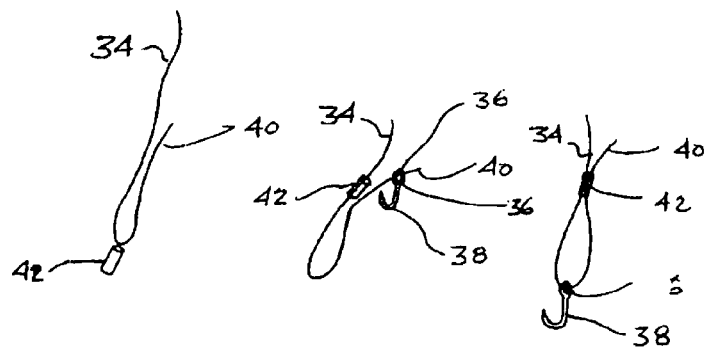
FIG. 3A is a view of a fishing line with a sleeve to be used with the invention.
FIG. 3B is a view of a fishing line with a sleeve encompassing one strand thereof.
FIG. 3C is a view of a fishing line with a sleeve encompassing both strands of the fishing line and with a hook loosely affixed thereto.

Turning now to FIGS. 3A–3F, there is shown a series of schematic steps that can be used to secure a hook to a fishing line with the use of the present invention. Taking, therefore, FIG. 3A first, there is a view of a fishing line 34 having a free end 40 similar to the FIGS. 2A–2D embodiment and illustration. In FIG. 3A, there is also a sleeve 42 that is preferably comprised of a plastic material that is basically of the same composition as the monofilament fishing line 34.

Figure 3D:
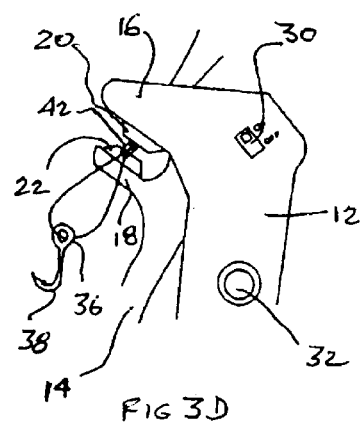
FIG. 3D is a side view of the welding device of the present invention welding the strands of fishing line within a sleeve and with the jaws in the open position.

Accordingly, turning now to FIG. 3B, the free end 40 of the fishing line 34 has been threaded through the sleeve 42 and also through the eye 36 of the fishhook 38. In FIG. 3C, that free end 40 of the fishing line 34 has again been threaded through the sleeve 42. In the step of FIG. 3D, the sleeve 42 having both strands of the fishing line 34 passing therethrough, is positioned within the upper and lower welding plates 20, 22 within the upper and lower jaws 20, 22 which are in the open position.

Figure 3E:
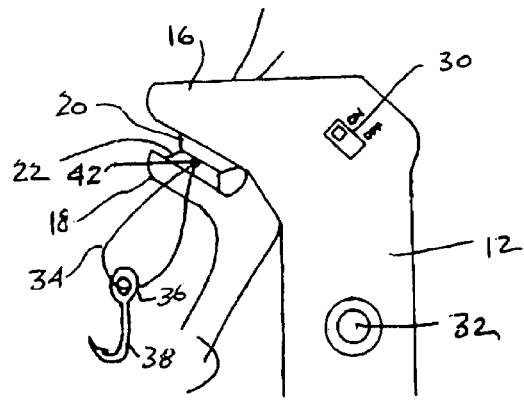
FIG. 3E is a side view of the welding device of the present invention welding the strands of fishing line within a sleeve and with the jaws in the closed position.

Next, in FIG. 3E, the upper and lower jaws 20, 22 have been moved to their closed position by the manipulation, by the user, of the movable hand grip 14 with respect to the hand grip of the main body 12. Accordingly, in the closed position of FIG. 3E, the user can push the welding power button 32 to heat the sleeve 42 as well as the strands of the fishing line 34 to provide a strong junction between the strands of the fishing line 34 and sleeve 42 together in a smooth junction with the sleeve 42 adding additional strength of the junction.

Figure 3F:
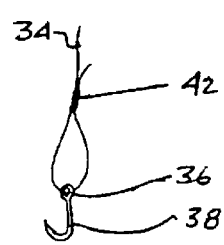
FIG. 3F is a view of the welded fishing line with a sleeve welded thereto.

Finally, in FIG. 3F, there is shown the completed affixation of the fishhook 38 to the fishing line 34 with the sleeve 42 also welded to the fishing line 34, as stated, for the additional strength of that junction.

Turning finally to FIGS. 4A–4C, there are shown side views of the upper and lower welding plates 20, 22 and showing, in FIG. 4A, V-shaped indentations 44 in those upper and lower welding plates 20, 22, that are mirror images and which mate with each other with the fishing lines sandwiched therebetween. In FIG. 4B, there are arcuate shaped indentations 46 and in FIG. 4C, there are rectangular indentations 48. The various differing configurations of FIGS. 4A–4C are but representative of the configurations that can be formed in the upper and lower welding plates 20 and 22. Many other configurations are possible and still be capable of carrying out the welding process of the present invention.

Those skilled in the art will readily recognize numerous adaptations and modifications which can be made to the present fishing line welding device of the present invention which will result in an improved process and device, yet all of which will fall within the scope and spirit of the present invention as defined in the following claims. Accordingly, the invention is to be limited only by the following claims and their equivalents.

I claim:

1. A method of affixing monofilament plastic fishing lines together, said method comprising the steps of:

providing a hand held device having clamping jaws and an independent source of electrical power;

providing a monofilament fishing line, passing the monofilament fishing line through a fishing device, manipulating the hand held device to clamp the monofilament fishing lines together on each side of the fishing device to clamp the monofilament fishing lines between the clamping jaws in an abutting relationship in contact with each other;

applying heat powered by the independent source of power to the monofilament fishing lines while clamped together to melt the monofilament fishing lines to weld the monofilament fishing lines together to form a loop welded together with the fishing device retained in the loop.

2. A method of affixing monofilament plastic lines together as defined in claim 1 wherein said step of applying heat comprises applying heat by a resistance heater.

3. A method of affixing monofilament plastic lines together as defined in claim 1 wherein said step of applying heat comprises applying heat provided by ultrasonic energy.

4. A method of affixing monofilament plastic lines together as defined in claim 1 wherein said step of providing a hand held device comprises providing a device having a main body and a movable hand grip and said step of manipulating the hand held device comprises squeezing said movable hand grip toward said main body.

5. A method of affixing monofilament plastic lines together as defined in claim 4 wherein said movable hand grip is biased away from said main body.

6. A method of affixing monofilament plastic lines together as defined in claim 1 wherein said method further comprises the step of slipping a sleeve over the monofilament fishing lines and said step of manipulating the hand held device to clamp the monofilament fishing lines together comprises manipulating the hand held device to clamp the sleeve through which the monofilament fishing lines pass between the clamping jaws and the step of applying heat comprises applying heat to melt the sleeve about the monofilament fishing lines.

* * * * *